(12) United States Patent
Namazue et al.

(10) Patent No.: US 11,782,228 B2
(45) Date of Patent: Oct. 10, 2023

(54) OPTICAL FIBER CABLE

(71) Applicant: Fujikura Ltd., Tokyo (JP)

(72) Inventors: Akira Namazue, Sakura (JP); Shogo Shimizu, Sakura (JP); Go Taki, Sakura (JP); Okimi Mukai, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/268,313

(22) PCT Filed: Dec. 4, 2020

(86) PCT No.: PCT/JP2020/046192
§ 371 (c)(1),
(2) Date: Feb. 12, 2021

(87) PCT Pub. No.: WO2021/117843
PCT Pub. Date: Jun. 17, 2021

(65) Prior Publication Data
US 2021/0382255 A1 Dec. 9, 2021

(30) Foreign Application Priority Data

Dec. 11, 2019 (JP) .................................. 2019-223813

(51) Int. Cl.
*G02B 6/44* (2006.01)

(52) U.S. Cl.
CPC ........... *G02B 6/443* (2013.01); *G02B 6/4431* (2023.05)

(58) Field of Classification Search
CPC ...... G02B 6/52; G02B 6/4429; G02B 6/4432; G02B 6/4433
See application file for complete search history.

(56) References Cited

U.S. PATENT DOCUMENTS 6,760,522 B2 * 7/2004 Okada .................. G02B 6/4495
385/113
9,323,022 B2 * 4/2016 Bringuier ............... G02B 6/443
(Continued)

FOREIGN PATENT DOCUMENTS

CN 201364407 Y * 12/2009 ........... G02B 6/4485
JP 2000121893 A 4/2000
(Continued)

OTHER PUBLICATIONS

English translation of KR101140219B1 by Google Patents (Year: 2010).*
(Continued)

*Primary Examiner* — Charlie Y Peng
(74) *Attorney, Agent, or Firm* — Osha Bergman Watanabe & Burton LLP

(57) ABSTRACT

An optical fiber cable includes: a sheath including recesses and protrusions that are alternately disposed in a circumferential direction on an outer circumferential surface of the sheath; a core that includes optical fibers and is accommodated in the sheath; and tensile strength members embedded in the sheath. The core is interposed between the tensile strength members in a transverse cross-sectional view. In the transverse cross-sectional view, the tensile strength members are embedded in portions of the sheath facing outward from the core in a first direction in which the two tensile strength members face each other in the transverse cross-sectional view.

9 Claims, 7 Drawing Sheets

(56) References Cited

U.S. PATENT DOCUMENTS

| | | | |
|---|---|---|---|
| 2004/0240810 A1 | 12/2004 | Moon | |
| 2005/0013573 A1 | 1/2005 | Lochkovic et al. | |
| 2006/0127016 A1* | 6/2006 | Baird ................... | G02B 6/4495 |
| | | | 385/113 |
| 2007/0077010 A1 | 4/2007 | Melton et al. | |
| 2013/0188916 A1* | 7/2013 | Bradley ............... | G02B 6/4429 |
| | | | 385/113 |
| 2015/0268437 A1* | 9/2015 | Chen ................... | G02B 6/4438 |
| | | | 385/100 |
| 2018/0301245 A1* | 10/2018 | Glew ..................... | H01B 7/421 |
| 2020/0209505 A1* | 7/2020 | Ohno ................... | G02B 6/4495 |
| 2020/0285010 A1* | 9/2020 | Abernathy ........... | G02B 6/4495 |

FOREIGN PATENT DOCUMENTS

| | | | | |
|---|---|---|---|---|
| JP | 2007011018 A | | 1/2007 | |
| JP | 2009237341 A | | 10/2009 | |
| KR | 2006081266 A | * | 7/2006 | ........... G02B 6/4494 |
| KR | 10-2012-0012712 A | | 2/2012 | |
| KR | 101140219 B1 | * | 2/2012 | |
| TW | 201812368 A | | 4/2018 | |
| WO | 2018150947 A1 | | 8/2018 | |
| WO | 2020075734 A1 | | 4/2020 | |
| WO | 2020256019 A1 | | 12/2020 | |
| WO | WO-2020256019 A1 | * | 12/2020 | |

OTHER PUBLICATIONS

International Search Report issued for International Application No. PCT/JP2020/046192, dated Mar. 16, 2021 (4 pages).
Office Action issued for corresponding Taiwanese Patent Application No. 109143295, dated Sep. 3, 2021 (4 pages).

* cited by examiner

FIG. 1
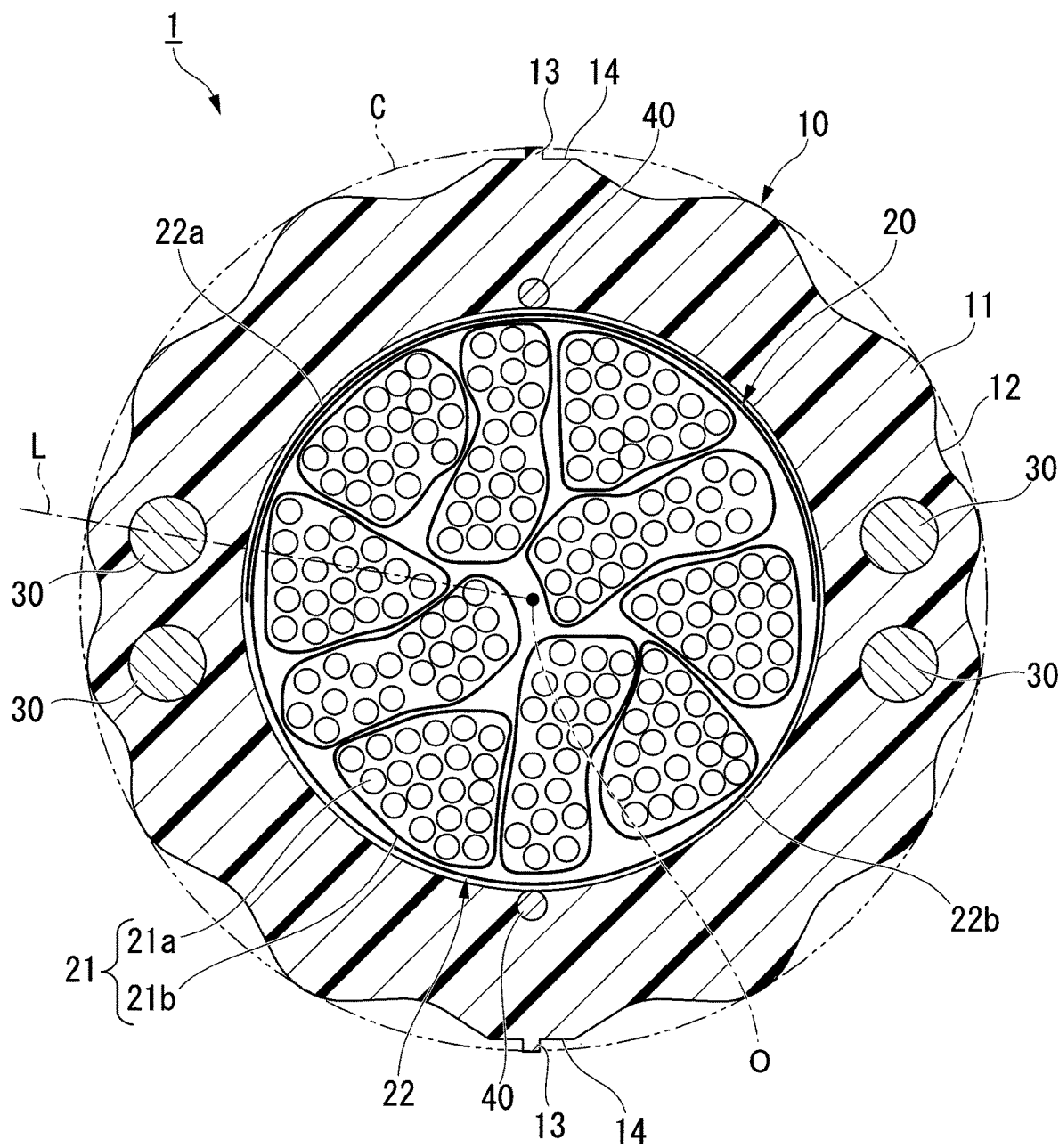
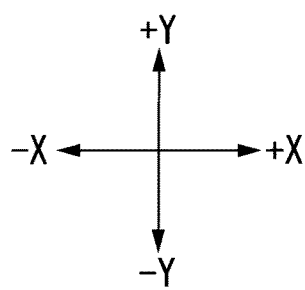

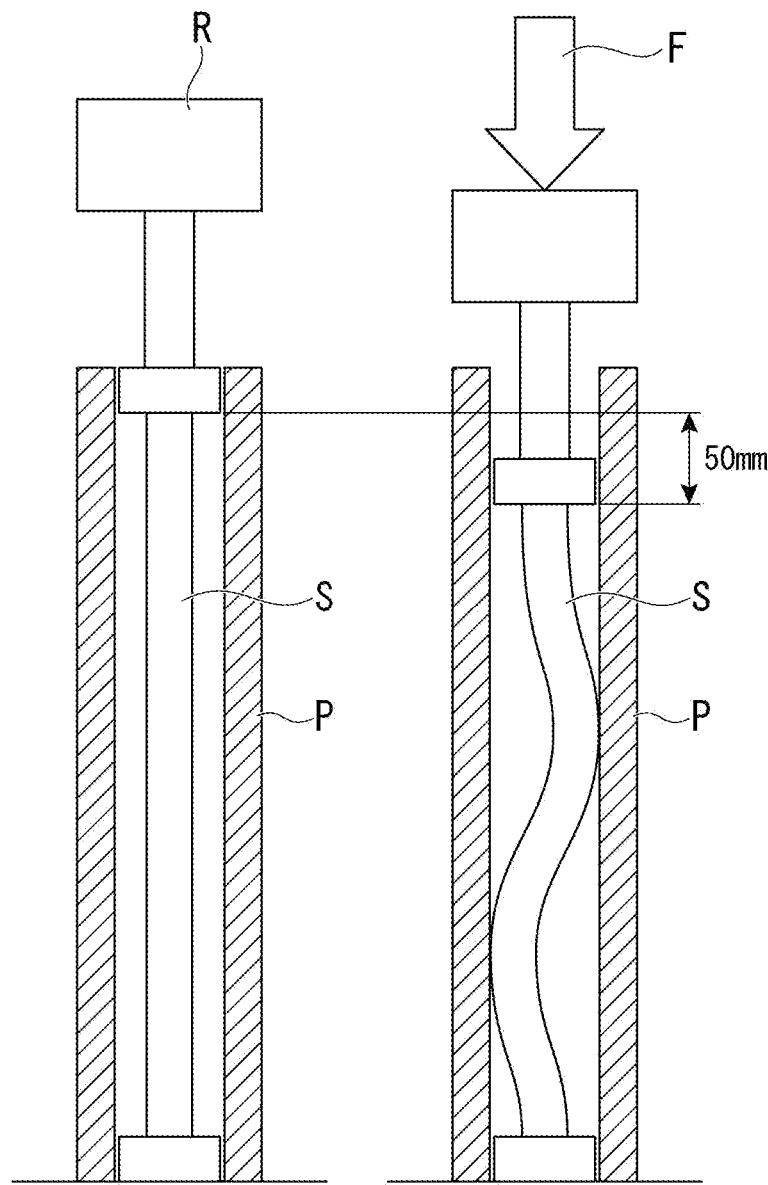

OPTICAL FIBER CABLE

CROSS-REFERENCE TO RELATED APPLICATIONS

This is a U.S. National Stage application of International Application No. PCT/JP2020/046192 filed Dec. 4, 2020, which claims priority from Japanese patent application No. 2019-223813 filed Dec. 11, 2019. These references are incorporated herein in their entirety by reference.

BACKGROUND

Technical Field

The present invention relates to an optical fiber cable.

Description of Related Art

Patent Literature 1 discloses an optical fiber cable including a sheath and a core accommodated in the sheath. Recesses and protrusions are alternately formed on a surface of a sheath, thereby reducing friction between a cable passage and a sheath.

In Patent Document 1, a core is a so-called a slot type, and has a rod in which a plurality of slots are formed. A through-hole is formed in a central portion of a rod, and a tensile strength member for protecting an optical fiber from tension is disposed inside the through-hole.

In this type of optical fiber cable, in order to increase installing density of the optical fiber, the rod may be omitted and the tensile strength member may be embedded in the sheath.

PATENT LITERATURE

Patent Literature 1

Japanese Unexamined Patent Application, First Publication No. 2000-121893

In the optical fiber cable of Patent Document 1, when the tensile strength member is embedded in the sheath, a thickness of the sheath becomes excessively small when the positions of the recess and the tensile strength member are close to each other. Further, the larger a diameter of the tensile strength member, the smaller the thickness of the sheath. Therefore, it is conceivable to increase the number of tensile strength members, and dispose the tensile strength member having a small wire diameter inside each protrusion. However, when the tensile strength member is disposed inside each protrusion, the core is surrounded by a plurality of tensile strength members, thereby increasing an allowable bending diameter of the optical fiber cable.

SUMMARY

One or more embodiments of the present invention reduce an allowable bending diameter while embedding a tensile strength member in a sheath in an optical fiber cable in which recesses and protrusions are alternately formed on a surface of a sheath.

In one or more embodiments, an optical fiber cable according to one or more embodiments of the present invention includes a sheath; a core that has a plurality of optical fibers and is accommodated in the sheath; and, in the sheath, at least two tensile strength members embedded in the sheath so as to interpose the core therebetween in a transverse cross-sectional view, in which, a plurality of recesses and a plurality of protrusions alternately disposed in a circumferential direction are formed on an outer circumferential surface of the sheath, and in the transverse cross-sectional view, when a direction in which the two tensile strength members face each other is a first direction, the tensile strength members are embedded only in portions of the sheath facing outward from the core in the first direction.

According to one or more embodiments of the present invention, in an optical fiber cable in which recesses and protrusions are alternately formed on the surface of the sheath, an allowable bending diameter can be reduced while embedding a tensile strength member in the sheath.

BRIEF DESCRIPTION OF THE DRAWINGS

FIG. 1 is a transverse cross-sectional view of an optical fiber cable according to one or more embodiments.

FIGS. 4A-4B are diagrams illustrating a buckling resistance test.

DETAILED DESCRIPTION

Figure 2:
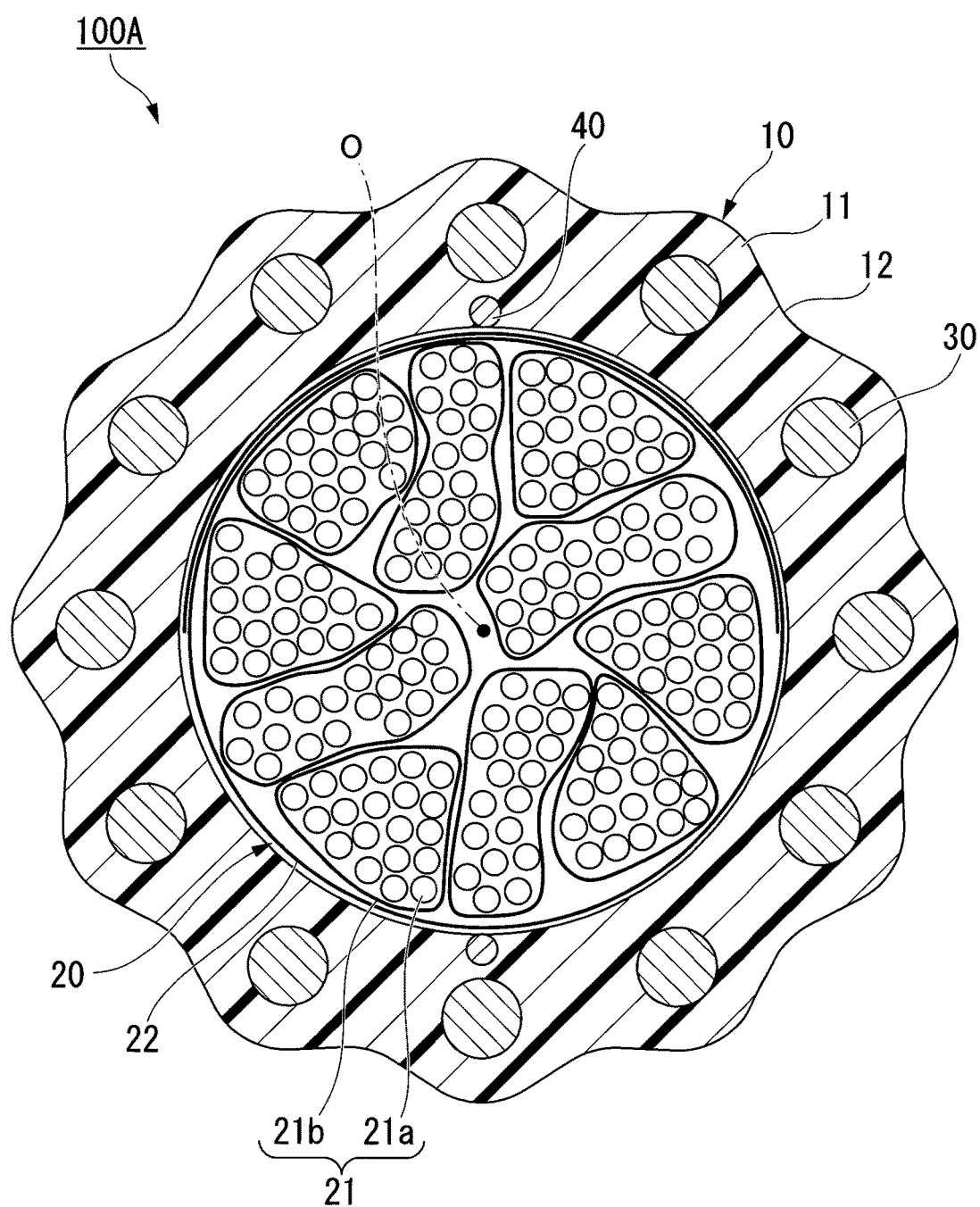
FIG. 2 is a transverse cross-sectional view of an optical fiber cable according to Test Example 2.

Hereinafter, an optical fiber cable of one or more embodiments will be described with reference to the drawings.

As illustrated in FIG. 1, the optical fiber cable 1 includes a sheath 10, a core 20 accommodated in the sheath 10, and a plurality of tensile strength members 30 and a plurality of ripcords 40 embedded in the sheath 10. The optical fiber cable 1 according to one or more embodiments includes four tensile strength members 30 and two ripcords 40.

The core 20 has a plurality of optical fiber units 21, and a wrapping tube 22 that wraps these optical fiber units 21. Each of the optical fiber units 21 has a plurality of optical fibers 21a and a binding material 21b that binds the optical fibers 21a.

(Direction Definition)

In one or more embodiments, a central axis of the core 20 is referred to as a central axis O. Further, a longitudinal direction of the optical fiber cable 1 (longitudinal direction of the core 20) is simply referred to as a longitudinal direction. The cross-section orthogonal to the longitudinal direction is referred to as a transverse cross-section. In the transverse cross-sectional view (FIG. 1), a direction intersecting the central axis O is referred to as a radial direction, and a direction revolving around the central axis O is referred to as a circumferential direction.

In one or more embodiments, a total of four tensile strength members 30 are disposed so as to interpose the core 20 therebetween. In the transverse cross-sectional view, a direction in which the core 20 is interposed by the tensile strength members 30 is referred to as a first direction X, and a direction orthogonal to the first direction X is referred to as a second direction Y. One side in the first direction X is referred to as the +X side, and the other side is referred to as the −X side. One side in the second direction Y is referred to as a +Y side, and the other side is referred to as a −Y side.

The four tensile strength members 30 are disposed so as to interpose the core 20 therebetween in the first direction X. As shown in FIG. 1, in the transverse cross-sectional view, two tensile strength members 30 are located on the +X side of the core 20, and the remaining two tensile strength members 30 are located on the −X side of the core 20. Note that, the number of tensile strength members 30 can be changed as appropriate, and may be, for example, two. When the number of the tensile strength members 30 is two, one tensile strength member 30 is disposed on the +X side of the core 20, and the other tensile strength member 30 is disposed on the −X side of the core 20. Similarly, when the number of tensile strength members 30 is an even number of 6 or more, half of the tensile strength members 30 are disposed on the +X side of the core 20, and the other half of the tensile strength members 30 are disposed on the −X side of the core 20.

In the sheath 10, the tensile strength member 30 is not disposed in a portion of which a position coincides with the core 20 in the first direction X. In other words, the tensile strength member 30 is embedded only in a portion of the sheath 10, facing outward (+X side or −X side) from the core 20 in the first direction X, and the tensile strength member 30 is not disposed on the +Y side and the −Y side of the core 20. The reason will be described later, but even in a case where the number of tensile strength members 30 is changed, the tensile strength members 30 may be embedded only in the portions of the sheath 10, facing outward from the core 20 in the first direction X.

As a material of the tensile strength member 30, for example, a metal wire (steel wire or the like), a tensile strength fiber (aramid fiber or the like), fiber reinforced plastics (FRP), and the like can be used. As specific examples of the FRP, a GFRP using glass fiber, a KFRP using kevlar fiber, a PBO-FRP using poly-paraphenylene benzobisoxazole (PBO), and the like can be used.

The ripcords 40 are disposed so as to interpose the core 20 therebetween in the second direction Y. One ripcord 40 is located on the +Y side of the core 20, and the other one ripcord 40 is located on the −Y side of the core 20. Each ripcord 40 is disposed so as to be in contact with the core 20 from the outside in the radial direction. Note that, the number of ripcords 40 can be changed as appropriate, and may be one or a plurality of three or more.

As the ripcord 40, a yarn (yarn) obtained by twisting fibers such as polypropylene (PP) and polyester can be used. The tensile strength member 30 has a role of protecting the optical fiber 21a from tension, while the ripcord 40 has a role of tearing the sheath 10. Therefore, the materials of the ripcord 40 and the tensile strength member 30 are different. Specifically, a tensile elastic modulus of the tensile strength member 30 is larger than that of the ripcord 40. Also, the ripcord 40 is more flexible than the tensile strength member 30.

The optical fiber unit 21 according to one or more embodiments is a so-called intermittently-adhered optical fiber ribbon, and when a plurality of optical fibers 21a are pulled in a direction orthogonal to the longitudinal direction, they are attached to each other so as to spread in a mesh shape (spider web shape). Specifically, one optical fiber 21a is attached to the adjacent optical fibers 21a on both sides thereof at positions different in the longitudinal direction. Further, adjacent optical fibers 21a are attached to each other at a certain interval in the longitudinal direction.

A plurality of the optical fiber units 21 are twisted together about the central axis O. The aspect of twisting may be spiral or SZ.

Note that, an aspect of the optical fiber unit 21 is not limited to the intermittently-adhered optical fiber ribbon, and may be appropriately changed. For example, the optical fiber unit 21 may be one obtained by simply binding a plurality of optical fibers 21a with a binding material 21b.

The wrapping tube 22 wraps a plurality of optical fiber units 21 and is formed into a cylindrical shape. Both end portions (first end portion and second end portion) of the wrapping tube 22 in the circumferential direction are overlapped each other to form a wrap portion 22a. A portion of the wrapping tube 22 excluding the wrap portion 22a is referred to as a non-wrap portion 22b. The non-wrap portion 22b is positioned between the first end portion and the second end portion forming the wrap portion 22a.

Since the wrapping tube 22 has the wrap portion 22a, it is possible to prevent the sheath 10 from coming into contact with the constituent members inside the wrapping tube 22. As a result, when the sheath 10 is extruded and formed, it is possible to prevent the optical fiber 21a from being taken into the softened sheath 10 and an extra length ratio of the optical fiber 21a to the optical fiber cable from becoming unstable. Further, it is possible to suppress an increase in transmission loss due to the optical fiber 21a being interposed between the wrapping tube 22 and the sheath 10.

As the material of the wrapping tube 22, a non-woven fabric, a plastic tape member, and the like can be used. When the wrapping tube 22 is made of plastic, polyethylene terephthalate, polyester, and the like can be used as the material. Further, as the wrapping tube 22, a water-absorbing tape obtained by imparting water absorbency to the above-described non-woven fabric or tape member may be used. In this case, the waterproof performance of the optical fiber cable 1 can be improved. When a plastic tape member is used as the wrapping tube 22, water absorbency may be imparted by applying a water absorbing powder to the surface of the tape member.

The sheath 10 is formed into a cylindrical shape centered on the central axis O. As the material of the sheath 10, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

A plurality of recesses (concavities) 12 and protrusions (convexities) 11 are formed on the outer circumferential surface of the sheath 10. The recesses 12 and the protrusions 11 are disposed alternately in the circumferential direction. In this way, an uneven shape is formed on the outer circumferential surface of the sheath 10. The recesses 12 and the protrusions 11 extend along the longitudinal direction. The protrusions 11 are formed in a curved surface shape so as to protrude outward in the radial direction, and the recesses 12 are formed in a curved surface shape so as to be recessed inward in the radial direction. Further, in the transverse cross-sectional view, connecting portions between the protrusions 11 and the recesses 12 have a curved shape. As described above, since the protrusions 11 and the recesses 12 are continuously formed in a curved shape, even if a force in the circumferential direction acts on the protrusions 11, stress is less likely to be concentrated on the recesses 12. Therefore, it is suppressed that cracks and the like occur in the recess 12, and the strength of the sheath 10 is increased.

A straight line L shown in FIG. 1 is a straight line connecting the central axis O and the center of the tensile strength member 30 in a transverse cross-sectional view. In the transverse cross-sectional view, the tensile strength member 30 is located inside the protrusion 11, and a top portion of the protrusion 11 located outside the tensile strength member 30 in the radial direction is located on the straight line L. The "top portion" in the present specification is a portion of the protrusion 11 that is curved outward in the radial direction. Although only the straight line L corresponding to one tensile strength member 30 is shown in FIG. 1, as for the other three tensile strength members 30, the top portion of the protrusion 11 located outside each tensile strength member 30 in the radial direction is located on the straight line connecting the tensile strength member 30 and the central axis O.

Flat surfaces 14 and marking portions 13 protruding radially outward from the flat surface 14 are formed on the +Y side end portion and the −Y side end portion of the sheath 10. The positions of the marking portions 13 in the circumferential direction coincide with the positions of the ripcords 40. That is, the ripcords 40 are located between the marking portions 13 and the core 20. The marking portion 13 is a mark for displaying the position of the ripcord 40. The sheath 10 can be torn by making a notch in the sheath 10 from the vicinity of the marking portion 13, taking out a portion of the ripcord 40, and pulling the ripcord 40 in the longitudinal direction. This facilitates the work of taking out the core 20 from the sheath 10.

In the transverse cross-sectional view, the flat surface 14 extends along the first direction X. The marking portion 13 is formed at the central portion of the flat surface 14 in the first direction X. An arc C in FIG. 1 is a circumscribed circle that circumscribes the plurality of protrusions 11, and is hereinafter referred to as a circumscribed circle C. In the transverse cross-sectional view, an outer end of the marking portion 13 in the radial direction is located on the arc C.

Note that, the outer end of the marking portion 13 in the radial direction may be located outside the circumscribed circle C or inside the circumscribed circle C. However, in a case where a portion of the marking portion 13 is located outside the circumscribed circle C, the friction between the marking portion 13 and the inner surface of a micro-duct becomes large when the optical fiber cable 1 is installed in the micro-duct. Therefore, the outer end of the marking portion 13 in the radial direction may be located on the circumscribed circle C or inside the circumscribed circle C.

By forming the marking portion 13 having a shape different from that of the protrusion 11 as in one or more embodiments, it enables the user to recognize the position of the ripcord 40 by touch. However, the form of the marking portion 13 can be changed as appropriate. For example, the marking portion may be formed by disposing the protrusion 11 instead of the flat surface 14 and the marking portion 13 in FIG. 1 and coloring the top portion of the protrusion 11. Also, in this case, the position of the ripcord 40 can be displayed by the marking portion formed by coloring.

As described above, the optical fiber cable 1 according to one or more embodiments includes a sheath 10, a core 20 accommodated in the sheath 10, and at least two tensile strength members 30 embedded in the sheath 10 so as to interpose the core 20 therebetween in the transverse cross-sectional view. Further, a plurality of protrusions 11 and a plurality of recesses 12 alternately disposed in the circumferential direction are formed on the outer circumferential surface of the sheath 10. As a result, when the optical fiber cable 1 is installed in the micro-duct, a contact area between the sheath 10 and the inner surface of the micro-duct and a resistance force due to the contact are reduced, and the optical fiber cable 1 can be installed smoothly. Further, since the tensile strength member 30 is embedded in the sheath 10, the installing density of the optical fiber 21a can be increased as compared with a case where the tensile strength member 30 is disposed in the core 20.

Further, in the transverse cross-sectional view, the top portion of the protrusion 11 located outside the tensile strength member 30 in the radial direction is located on the straight line L connecting the center of the core 20 (central axis O) and the center of one tensile strength member 30. As a result, the thickness of the sheath 10 around the tensile strength member 30 is less likely to decrease. Therefore, the strength of the sheath 10 can be ensured. Note that, if the top portion of the protrusion 11 located outside the tensile strength member 30 in the radial direction is located on the straight line connecting the center of at least one tensile strength member 30 among a plurality of tensile strength members 30 and the central axis O, the strength of at least the sheath 10 around the tensile strength member 30 can be secured.

Further, a marking portion 13 protruding outward in the radial direction is formed in the sheath 10, and the ripcord 40 is located between the marking portion 13 and the core 20. In the transverse cross-sectional view, when the optical fiber cable 1 is installed in the micro-duct, it is possible to suppress strong friction between the marking portion 13 and the micro-duct, by positioning the outer end of the marking portion 13 in the radial direction on the circumscribed circle C that circumscribes the plurality of protrusions 11, or inside the circumscribed circle C.

Further, since the marking portion 13 has a shape different from that of the protrusion 11, the user can recognize the position of the ripcord 40 by touch.

EXAMPLES

Hereinafter, the above embodiments will be described with reference to specific examples. Note that, the present invention is not limited to the following examples.

In one or more embodiments, the optical fiber cables of Test Examples 1 to 3 shown in Table 1 below were prepared.

TABLE 1

Figure 3:
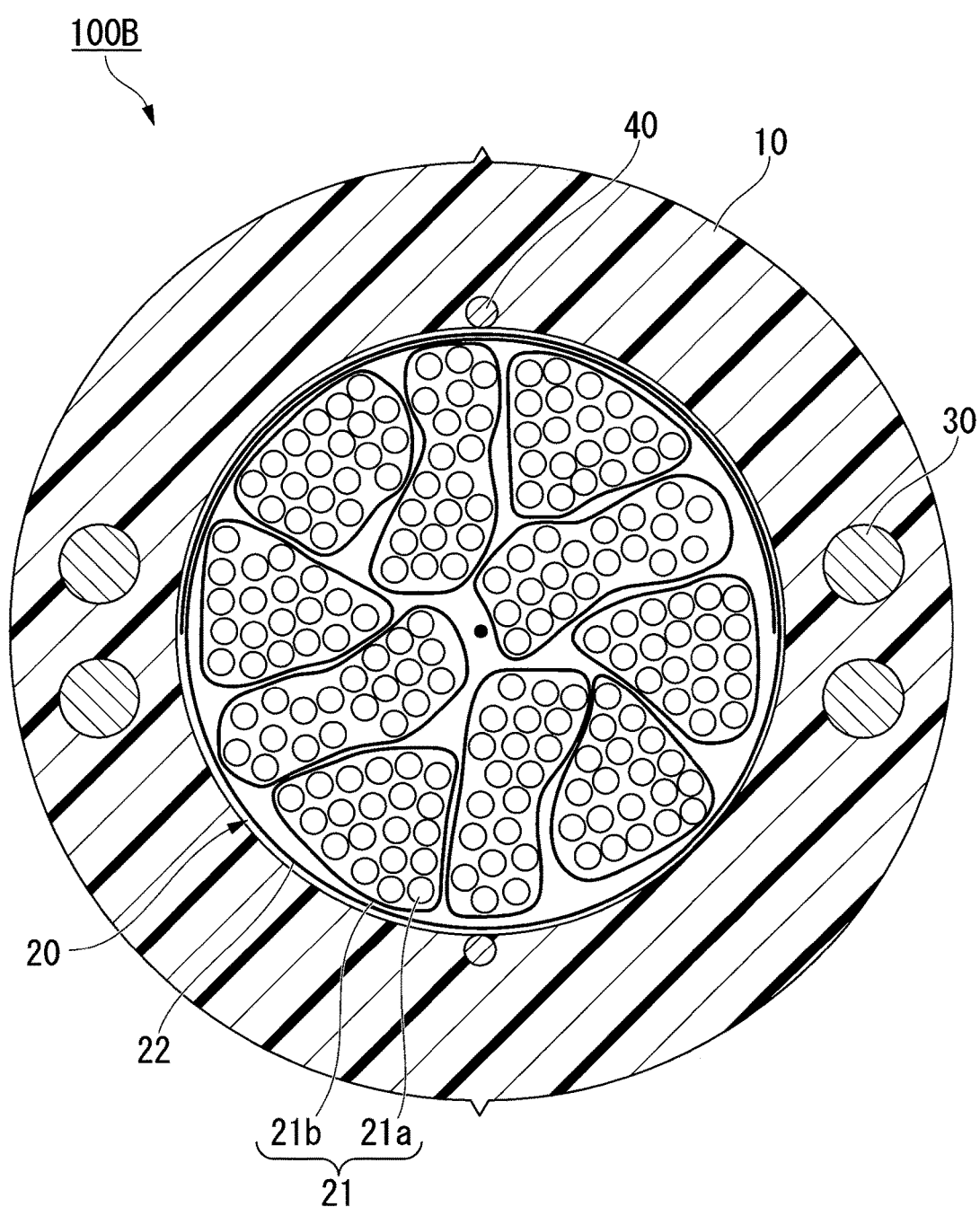
FIG. 3 is a transverse cross-sectional view of an optical fiber cable according to Test Example 3.

|  | Test Example 1 | Test Example 2 | Test Example 3 |
| --- | --- | --- | --- |
| Cross-Sectional Shape | FIG. 1 | FIG. 2 | FIG. 3 |
| Cable Outer Diameter (D) | 8 mm | 7 mm | 8 mm |
| Weight | 45 kg/km | 35 kg/km | 45 kg/km |
| Number of Tensile Strength Members | 4 | 10 | 4 |
| Diameter of Tensile Strength Member | 1 mm | 0.5 mm | 0.7 mm |
| Material of Tensile Strength Member | GFRP | KFRP | GFRP |
| Buckling Load | 700N | 370N | — |
| Kink Diameter d | 9 D | 14 D | — |
| Air-blowing Test | ≥2000 m | ≥2000 m | 180 m |

The optical fiber cable 1 of Test Example 1 is the same as that of the above embodiments, and has a transverse cross-sectional shape as shown in FIG. 1. An optical fiber cable 100A of Test Example 2 has a transverse cross-sectional shape as shown in FIG. 2, and tensile strength members 30 are disposed inside each of protrusions 11. An optical fiber cable 100B of Test Example 3 has a transverse cross-sectional shape as shown in FIG. 3, and the sheath 10 does not have the protrusion 11 and the recess 12. The outer diameters of the optical fiber cables of Test Examples 1 to 3 are as shown in "Cable Outer Diameter (D)" in Table 1.

The weight per unit length, the number of tensile strength members 30, the material of tensile strength member 30, and the diameter of the tensile strength member 30 of Test Examples 1 to 3 are as shown in Table 1.

The results of the buckling resistance test are displayed in the "Buckling Load" column of Table 1. The details of the buckling resistance test will be described with reference to FIGS. 4A-4B. In the buckling resistance test, as shown in FIGS. 4A-4B, a straight pipe P imitating a micro-duct and a load cell R were used. The inner diameter of the pipe P is 20 mm, and the length thereof is 600 mm. Samples S of the optical fiber cables of Test Examples 1 to 3 were accommodated inside the pipe P. With the lower end of the sample S fixed, the upper end of the sample S was pushed by the load cell R at a speed of 200 mm/min. As shown in FIG. 4B, a load F (N) at the time when the sample S buckles in the pipe P and a push-in amount of the load cell R reaches 50 mm is shown in the "Buckling Load" column of Table 1.

As shown in Table 1, the buckling load of Test Example 1 is 700 N, and the buckling load of Test Example 2 is 370 N. As described above, in Test Example 1, about twice as much force as in Test Example 2 was required to buckle. It is considered that the reason why the optical fiber cable 1 of Test Example 1 is hard to buckle is that it has a bending direction that the cable is easy to bend. The optical fiber cable 1 bends in a direction (direction in which the tensile strength member 30 is less elongated) in which it is easy to bend, and as a result, the stress applied to the tensile strength member 30 is small. On the other hand, the optical fiber cable 100A of Test Example 2 has no bending direction that the cable is easy to bend, and when the optical fiber cable 100A is bent, the stress is immediately applied to the tensile strength member 30. From such a difference, it is considered that the optical fiber cable 1 of Test Example 1 is less likely to buckle than the optical fiber cable 100A of Test Example 2.

Figure 5A:
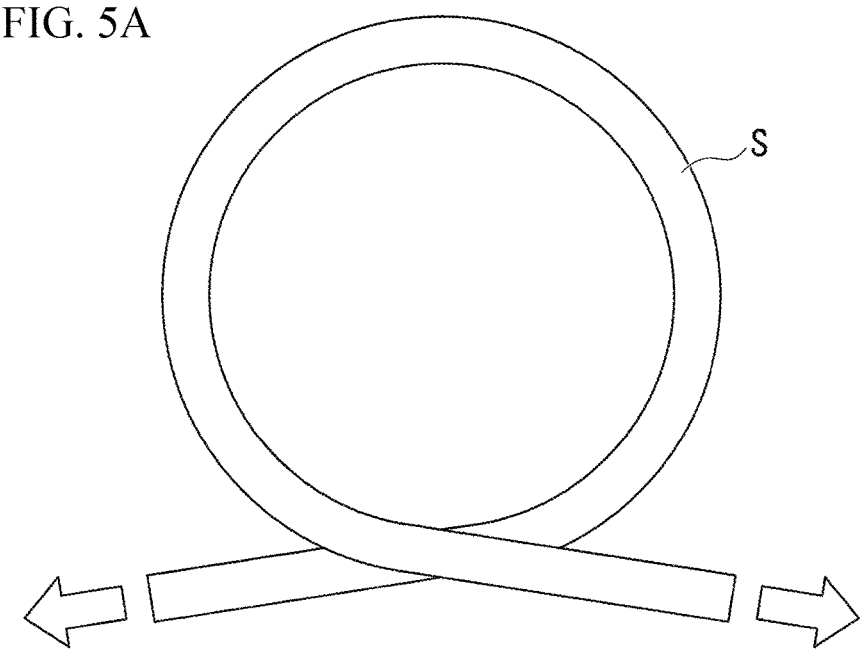
FIGS. 5A-5B are diagrams illustrating a kink test.
Figure 5B:
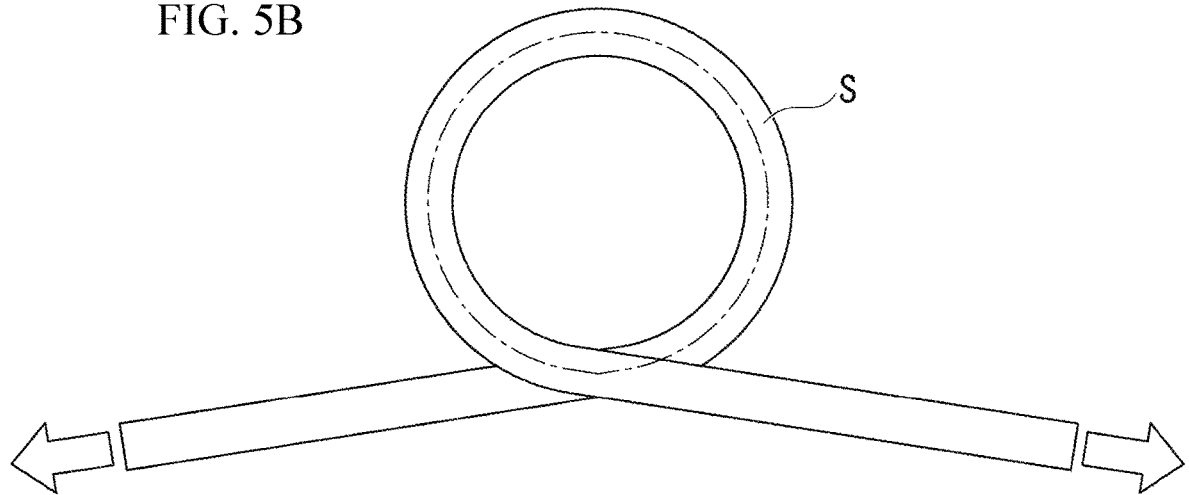

In the column of "Kink Diameter d" in Table 1, the results of the kink test conforming to IEC60794-1-21 Method E10 are displayed. The details of the kink test will be described with reference to FIGS. 5A-5B. First, as shown in FIG. 5A, a loop is created by using a sample S having a sufficient length. Then, both end portions of the sample S are pulled in the direction indicated by an arrow in FIG. 5A. As a result, the loop becomes smaller and becomes a state as shown in FIG. 5B. The length of the loop portion of the sample S (the length of a broken line in FIG. 5B) at the time when the kink occurs in the sample S was measured. The value obtained by dividing the length of the loop portion by a circumference ratio (Pi) is shown in Table 1 as the "Kink Diameter d".

Note that, the kink diameter d is shown as a multiple of the cable outer diameter D of each Test Example. As used in the present specification, the term "kink occurs" means that the sheath 10 is cracked, crushed, bumped, or the like, and the appearance of the optical fiber cable is not restored even if the bending is eliminated. This means that, the larger the kink diameter d, the larger the allowable bending diameter of the optical fiber cable, and the more difficult it is to install it in a micro-duct having a small radius of curvature.

As shown in Table 1, the kink diameter d of Test Example 1 is 9 D, and the kink diameter d of Test Example 2 is 14 D. As described above, it was confirmed that the optical fiber cable 1 of Test Example 1 is less likely to cause kink than the optical fiber cable 100A of Test Example 2. This difference is considered to be due to the difference in the disposition of the tensile strength members 30. In the optical fiber cable 100A of Test Example 2, the tensile strength members 30 are disposed so as to surround the core 20. Therefore, no matter which direction the optical fiber cable 100A is bent, the tensile strength members 30 are located inside and outside the bending, respectively. As a result, the tensile strength members 30 located inside the bending are strongly compressed, and the tensile strength members 30 located outside the bending are strongly stretched. As a result, the sheath 10 located inside or outside the bending is likely to be cracked, crushed, bumped, or the like, and the kink diameter d becomes large.

On the other hand, in the optical fiber cable 1 of Test Example 1, the tensile strength members 30 are embedded only in the portions of the sheath 10 facing outward from the core 20 in the first direction X. In other words, the tensile strength member 30 is not disposed on the +Y side and the −Y side of the core 20. Therefore, when the optical fiber cable 1 is bent in the second direction Y, a strong compressive force or tensile force is less likely to act on the tensile strength member 30. As a result, the sheath 10 was less likely to be cracked, crushed, bumped, or the like, and the kink diameter d could be reduced.

Figure 6:
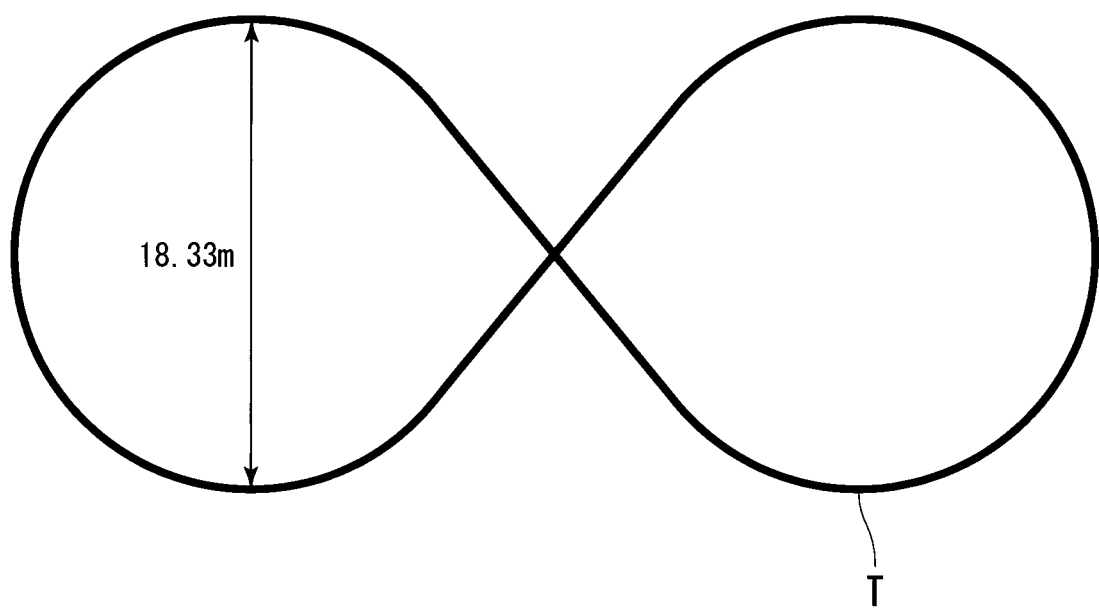
FIG. 6 is a diagram illustrating an air-blowing test.

The column of "Air-blowing Test" in Table 1 shows the result of air-blowing the samples S of Test Examples 1 to 3 to a track T shown in FIG. 6. The track T was configured by installing a micro-duct so as to draw a plurality of figures of the number 8. As shown in FIG. 6, a width of the track T in a direction orthogonal to a direction that two rings of the figure of the number 8 are arranged side by side is 18.33 m, and the micro-duct is installed such that a track length of one figure of the number 8 is 125 m. Note that, by installing the micro-duct to draw the figure of number 8 a plurality of times, the total length of the track T was set to 2000 m. Table 1 shows the distances that could be air-blown when the sample S was air-blown to the track T by using an air-blowing machine.

As shown in Table 1, the optical fiber cables of Test Example 1 and Test Example 2 could be air-blown by 2000 m or more. The optical fiber cable of Test Example 3 could be air-blown by 180 m.

As described above, it was confirmed that the optical fiber cables of Test Examples 1 and 2 are easier to be air-blown in the micro-duct as compared with the optical fiber cable of Test Example 3. It is considered that the reason for this is that the protrusion 11 and the recess 12 are formed on the surface of the sheath 10, so that the contact area between the micro-duct and the sheath 10 and the resistance force due to the contact are reduced.

As described above, in the optical fiber cable 1 of one or more embodiments, by embedding the tensile strength members 30 only in the portions of the sheath 10 facing outward from the core 20 in the first direction X, the kink due to bending is less likely to occur. As a result, in the optical fiber cable 1 in which the protrusions 11 and the recesses 12 are alternately formed on the surface of the sheath 10 and the tensile strength member 30 is embedded in the sheath 10, the allowable bending diameter (kink diameter d) can be reduced to make it easier to handle.

Note that, the technical scope of the present invention is not limited to the above-described embodiments, and various modifications can be made without departing from the spirit of the present invention.

For example, in the example of FIG. 1, the widths of the respective protrusions 11 in the circumferential direction are equal to each other, and one tensile strength member 30 is disposed inside one protrusion 11. However, as shown in FIG. 7, the widths of the plurality of protrusions 11 formed in the sheath 10 in the circumferential direction may be non-uniform.

Figure 7:
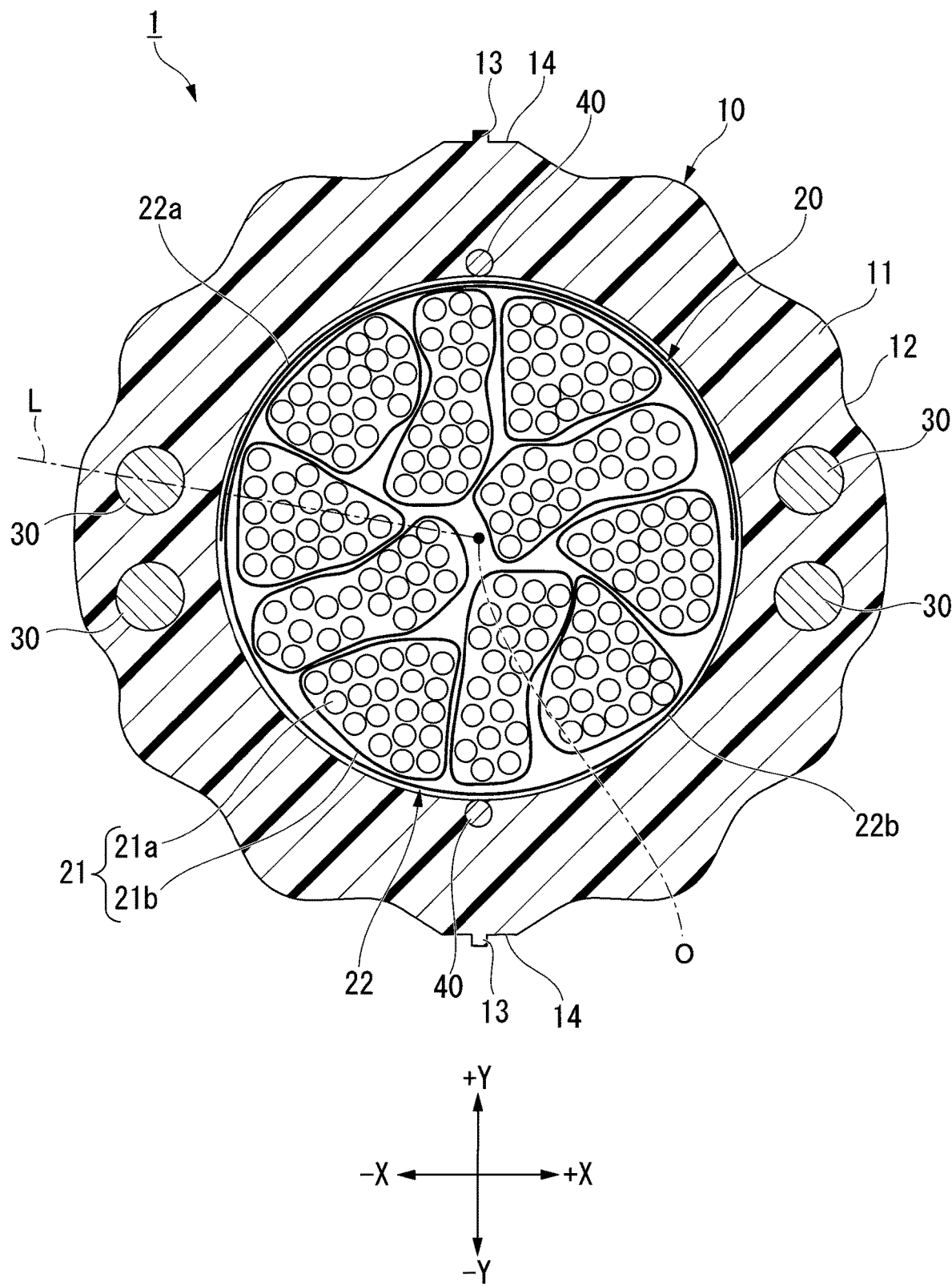
FIG. 7 is a transverse cross-sectional view of an optical fiber cable according to a modification example of one or more embodiments.

Further, as shown in FIG. 7, a plurality of (two or more) tensile strength members 30 may be disposed inside one protrusion 11. In this case, the wall thickness of the sheath 10 around the tensile strength member 30 can be increased to increase the strength of the sheath 10. Further, when an external force directed inward in the radial direction acts on the protrusion 11 located outside the tensile strength members 30 in the radial direction, the external force can be dispersed and received by the plurality of tensile strength members 30. Therefore, it is possible to prevent the sheath 10 from cracking or the like at the boundary portion with the tensile strength members 30.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical fiber cable
10 Sheath
11 Protrusion
12 Recess
13 Marking portion
20 Core
21a Optical fiber
30 Tensile strength member
40 Ripcord
C Circumscribed circle
L Straight line

The invention claimed is:

1. An optical fiber cable comprising:
a sheath comprising recesses and protrusions that are alternately disposed in a circumferential direction on an outer circumferential surface of the sheath;
a core that comprises optical fibers and is accommodated in the sheath; and
tensile strength members embedded in the sheath, wherein the core is interposed between the tensile strength members in a transverse cross-sectional view of the optical fiber cable, wherein
from the transverse cross-sectional view, all of the tensile strength members face one another across the core in a first direction, but not across the core in a second direction orthogonal to the first direction, and
a number of the protrusions in which the tensile strength members are embedded is less than a number of the protrusions in which the tensile strength members are not embedded.

2. The optical fiber cable according to claim 1, wherein, in the transverse cross-sectional view, on a straight line connecting a center of the core and a center of one of the tensile strength members, a top portion of one of the protrusions is disposed outside the one of the tensile strength members in a radial direction.

3. The optical fiber cable according to claim 1, further comprising:
a ripcord that is embedded in the sheath,
wherein, a marking portion protruding outward in a radial direction is disposed in the sheath,
the ripcord is disposed between the marking portion and the core, and
in the transverse cross-sectional view, an outer end of the marking portion in the radial direction is disposed either on a circumscribed circle circumscribing the protrusions or inside the circumscribed circle.

4. The optical fiber cable according to claim 1, wherein the tensile strength members are disposed inside one of the protrusions in the transverse cross-sectional view.

5. The optical fiber cable according to claim 1, further comprising:
a ripcord embedded in the sheath radially inward than one of the protrusions, wherein
none of the tensile strength members is disposed in the one of the protrusions in which the ripcord is embedded.

6. The optical fiber cable according to claim 1, wherein the tensile strength members are disposed such that the optical fiber cable is bendable in the second direction.

7. The optical fiber cable according to claim 1, wherein some of the protrusions are disposed outside of the core in the second direction.

8. An optical fiber cable comprising:
a sheath comprising recesses and protrusions that are alternately disposed in a circumferential direction on an outer circumferential surface of the sheath;
a core that comprises optical fibers and is accommodated in the sheath; and
tensile strength members embedded in the sheath, wherein the core is interposed between the tensile strength members in a transverse cross-sectional view of the optical fiber cable, wherein
from the transverse cross-sectional view, all of the tensile strength members are disposed in two of the protrusions that face one another across the core in a first direction, but not across the core in a second direction orthogonal to the first direction, and
a number of the protrusions in which the tensile strength members are embedded is less than a number of the protrusions in which the tensile strength members are not embedded.

9. The optical fiber cable according to claim 1, wherein a portion that is under one of the protrusions and that extends in a full thickness of the sheath in a radial direction of the optical fiber cable is made only of a material of the sheath.

* * * * *